US 7,363,354 B2

(12) United States Patent
Lahti

(10) Patent No.: US 7,363,354 B2
(45) Date of Patent: Apr. 22, 2008

(54) SYSTEM AND METHOD FOR IDENTIFYING AND ACCESSING NETWORK SERVICES

(75) Inventor: Jerry Lahti, Budapest (HU)

(73) Assignee: Nokia Corporation, Espoo (FI)

( * ) Notice: Subject to any disclaimer, the term of this patent is extended or adjusted under 35 U.S.C. 154(b) by 774 days.

(21) Appl. No.: 09/998,367

(22) Filed: Nov. 29, 2001

(65) Prior Publication Data

US 2003/0101246 A1 May 29, 2003

(51) Int. Cl.
G06F 15/16 (2006.01)
G06F 1/12 (2006.01)
(52) U.S. Cl. ........................ 709/219; 709/220; 455/406
(58) Field of Classification Search ................ 709/221, 709/217–219, 220; 455/406, 420, 456.1, 455/404
See application file for complete search history.

(56) References Cited

U.S. PATENT DOCUMENTS

| 5,832,505 | A  | * | 11/1998 | Kasso et al. ............. 707/104.1 |
| 6,112,244 | A  | * | 8/2000  | Moore et al. ................ 709/228 |
| 6,275,693 | B1 | * | 8/2001  | Lin et al. .................. 455/414.3 |
| 6,292,668 | B1 |   | 9/2001  | Alanara et al. |
| 6,643,690 | B2 | * | 11/2003 | Duursma et al. ........... 709/217 |
| 6,657,956 | B1 | * | 12/2003 | Sigaud ........................ 370/230 |
| 6,826,603 | B1 | * | 11/2004 | Giroir et al. ................ 709/220 |
| 2001/0056462 | A1 | * | 12/2001 | Kataoka ..................... 709/203 |
| 2002/0046236 | A1 | * | 4/2002 | Morimoto et al. .......... 709/203 |
| 2002/0068554 | A1 | * | 6/2002 | Dusse ......................... 455/419 |
| 2002/0123335 | A1 | * | 9/2002 | Luna et al. .................. 455/419 |
| 2003/0084177 | A1 | * | 5/2003 | Mulligan ..................... 709/230 |

FOREIGN PATENT DOCUMENTS

JP 2000010890 A 1/2000
WO WO 01/43390 6/2001

OTHER PUBLICATIONS

Jame Kurose, Computer Networking, Addision Wesley, (pp. 173-176).*
Publish dynamic application on the Web (using CGI to create dynamically updated pages), McClanahan, D., Internet, Web, Online Service Information, Database Web Advisor, v 15, n4, Apr. 1997, p. 60(1).*
Mobile Security-An Overview of GSM, SAT and WAP, Borcheding, M., Springler-Verlag Berlin Heidelberg, 1999, p. 133-141.*
Ab Object-Based Architecture of WAP-Compliant Applications, Canntaro, M. & Pascuzzi, D., IEEE 07-7695-0680-1/00, 2000, p. 178-185.*

(Continued)

Primary Examiner—Zarni Maung
(74) Attorney, Agent, or Firm—Hollingsworth & Funk, LLC

(57) ABSTRACT

A system and method for facilitating mobile terminal access to a particular network application available via multiple application servers on a network. An application identifier corresponding to the network application, and associated application access parameters including an application server address of one of the multiple applications servers, is embedded into provisioning information. The provisioning information is transmitted to at least one mobile terminal in connection with a provisioning procedure. The mobile terminal is provisioned to facilitate access to the network application via the application server identified by the application server address provided with the provisioning information.

50 Claims, 6 Drawing Sheets

OTHER PUBLICATIONS

Using XML to Develop Application for WAP and WWW Environments, Mikko Honkaka, Helsinki Univ. of Tech, 2000.*

XML Smartcards, Urien, Pascal et. al., Networking-ICN 2001: 1st Intl Conf Colmar, France, Jul. 2001., p. 811-820.*

Provisioning Boostrap, Wireless Application Procotol, WAP-184-ProvBoot-20010314-a, pp. 1-24.*

Wireless Device Configuration (OTASP/OTAPA) via ACAP, Network Working Group, RFC 2636, Gellens, R., Jul. 1999.*

WAP Push OTA Protocal, Version Nov. 8, 1999 (p. 1-20).

WAP Provisioning Architecture Overview, Version Mar. 14, 2001 (p. 1-22).

WAP Provisioning Content, Version Jul. 24, 2001 (p. 1-59).

* cited by examiner

SYSTEM AND METHOD FOR IDENTIFYING AND ACCESSING NETWORK SERVICES

FIELD OF THE INVENTION

The present invention relates generally to network communications systems, and more particularly, to a system and method for facilitating mobile terminal access to applications available via application servers on a network.

BACKGROUND OF THE INVENTION

Today's communications technologies have brought about a tremendous expansion of wireline and wireless networks. Wireless networking technologies have addressed a number of traditional consumer demands, while further providing more flexibility and immediacy of information transfer. Current and impending landline networking technologies have expanded to increasingly include wireless and mobile technologies. Through these networks, information can be downloaded to desktop systems, wireless systems, etc. For example, information available via the Internet can be downloaded onto mobile wireless units, such as cellular telephones, personal digital assistants (PDAs), laptop computers, etc.

One such technology facilitating the transfer of Internet content to and from wireless devices is the Wireless Application Protocol (WAP), which integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, to allow wireless device users to enjoy the benefits of the Internet across both platforms.

The types of information accessible via these wireline and wireless networks includes software applications and services, such as wireless services operable on wireless terminals. Improvements to wireless services are continually being made, including improvements in capacity, speed, and efficiency. Users of wireless services are obtaining increasing access to multimedia services such as video-on-demand, video conferencing, fast web access and file transfer. Existing and future services are, and will continue to be, provided by network service operators who make services and applications available to mobile device users via the network.

The "mobile Internet" relates to the accessibility of these services and applications to mobile devices operable on wireless networks. At present, the mobile Internet is being build on the World Wide Web (WWW) or WAP infrastructure. However, there is currently no official standard for identifying applications or services on the mobile Internet. Rather, applications or services are identified by the Uniform Resource Locator (URL) that is used to specify the network address at which these applications or services can be accessed. For example, a particular Internet service or application is accessed by entering a URL that points to the network host offering that service or application. While this approach in some respects is a sufficient manner of accessing such services, this is largely due to the fact that generally there has been no standardization of Web or WAP applications. For example, currently available search services provided by two or more different web searching applications likely provide similar functionality, but may not operate in the same way. Identifying non-standardized applications using URLs embedding real network addresses may therefore be acceptable in some cases for accessing the respective applications.

This approach, however, breaks down when applications and services are standardized (including standards recognized by standards bodies, proprietary standards or arrangements, etc.). This is because accessing such applications through dedicated URLs fails to address situations where standardized applications and services are provided by multiple service providers. For example, Multimedia Messaging Service (MMS) is a service which has been standardized together by the WAP Forum and 3GPP. Thus, many different service providers may offer the use of the same application, and therefore the existing practice can no longer be used to properly identify the application. This is because the URL will include the network addresses of respective application/service providers. As a result, it will identify the instance of the service provided by a particular application/service provider instead of the standardized service itself. For example, a web address including ". . . companyXYZ.com/MMS" cannot identify the MMS application in general, as other operators such as companyABC will also offer the application.

Another problem with the present methodology is that in the case of a standardized application, the user agent (application software) in the mobile device will typically not be the browser that is used to access URLs in general. If the only piece of information that the mobile device has is a URL pointing to a specific host, it has no means of deciding what the appropriate user agent is to be used.

Provisioning techniques, such as the existing WAP bootstrap provisioning, address some of the needs of mobile Internet users. One reason that provisioning is used for mobile devices is that mobile terminals are by nature limited devices. They typically have limited memory, storage, and processing capabilities. Therefore, mobile devices do not include all of the components required to access new or upgraded services that may be available on the network. When a mobile user wants to utilize new or upgraded services available on the network, the terminal must be configured to use those new services. Configuring a terminal to use a service on a network is generally referred to as "provisioning" the terminal. Provisioning may be performed upon initial setup of a mobile device, or may also be performed to upgrade and/or update services and applications already being used at that mobile device.

However, current provisioning techniques do not solve the problems identified above. Rather, current provisioning techniques have a scope that is limited to parameters required to establish basic network connectivity. The information is implicitly assumed to be applicable to all applications, and there is no means of associating parameter settings with a particular application.

Accordingly, there is a need in the network communications industry to allow mobile terminals to identify specific applications provided in various network application servers, particularly where such applications are standardized and hosted by different addressable network elements. The present invention solves these and other shortcomings of the prior art, and offers numerous advantages over prior art provisioning systems and methodologies.

SUMMARY OF THE INVENTION

The present invention is directed to a system and method for facilitating mobile terminal access to a particular application available via multiple application servers on a network. The present invention involves providing an application identifier and access parameters via a network server, such as a provisioning server, to a mobile terminal. The mobile terminal in turn utilizes the application identifier to identify and access the targeted application on a particular one of the multiple application servers hosting that application on the network.

In accordance with one embodiment of the invention, a method is provided for facilitating mobile terminal access to a network application that is hosted by multiple application servers on a network. An application identifier corresponding to the network application, and associated application access parameters including an application server address of one of the multiple applications servers, is embedded into provisioning information. The provisioning information is transmitted to at least one mobile terminal in connection with a provisioning procedure. The mobile terminal is provisioned to facilitate access to the network application via the application server identified by the application server address provided with the provisioning information. In accordance with another embodiment of the invention, a computer-readable medium having computer-executable instructions for carrying out such a method is provided. In accordance with a more particular embodiment of the invention, the method further includes pre-configuring a software module, such as a user agent, at the mobile terminal to recognize the application identifier, and accessing the network application via the application server corresponding to the application server address using the software module.

In accordance with another embodiment of the invention, a system is provided for facilitating mobile terminal access to a target application available via a plurality of application servers on a network. The system includes a provisioning element to provide one or more provisioning information files. As used herein, files, records, documents, blocks, or other terminology is not intended to connote any particular structure or type of information block, but rather is intended to generically include any type of format used to provide such provisioning information, including merely a sequence of information bytes. At least one of the provisioning files includes an application identifier corresponding to the target application. The provisioning file(s) further includes application access parameters associated with the application identifier, where at least one of the application access parameters includes an application server address of one of the plurality of application servers. The system includes a mobile terminal pre-configured to recognize the embedded application identifier upon receipt of the provisioning files. The mobile terminal accesses the target application at the application server address as prescribed by one or more of the application access parameters associated with the application identifier. In more particular embodiments, the provisioning network element includes a provisioning server coupled to the network, which implements push technology to push the provisioning information to the mobile terminal via the network. In accordance with another particular embodiment, the provisioning network element includes a portable or device-embedded component, such as a Subscriber Identity Module (SIM), WAP identify module (WIM), or a smart card that stores the provisioning information for transfer to the mobile device.

In accordance with another embodiment of the invention, a network element comprising a provisioning server is provided. The provisioning server transmits data readable by a mobile terminal and encoding one or more provisioning documents. The provisioning documents include an application identifier corresponding to a standardized network application hosted by a plurality of application servers. The provisioning documents further include application access parameters associated with the application identifier, where at least one of the application access parameters is an application server address of one of the plurality of application servers in which a mobile terminal recipient of the data can access the standardized network application.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention is directed to a system and method for facilitating mobile terminal access to a particular application available via multiple application servers on a network. The present invention involves providing an application identifier by a network server, such as a provisioning server, to a mobile terminal. Along with the application identifier are various access parameters that the mobile terminal uses to facilitate access to the application identified by the application identifier. The mobile terminal accesses the network application corresponding to the application identifier at a particular application server identified by the access parameters The access parameters also allow the mobile terminal to configure other access characteristics and connectivity settings associated with the targeted application server and application.

Figure 1:
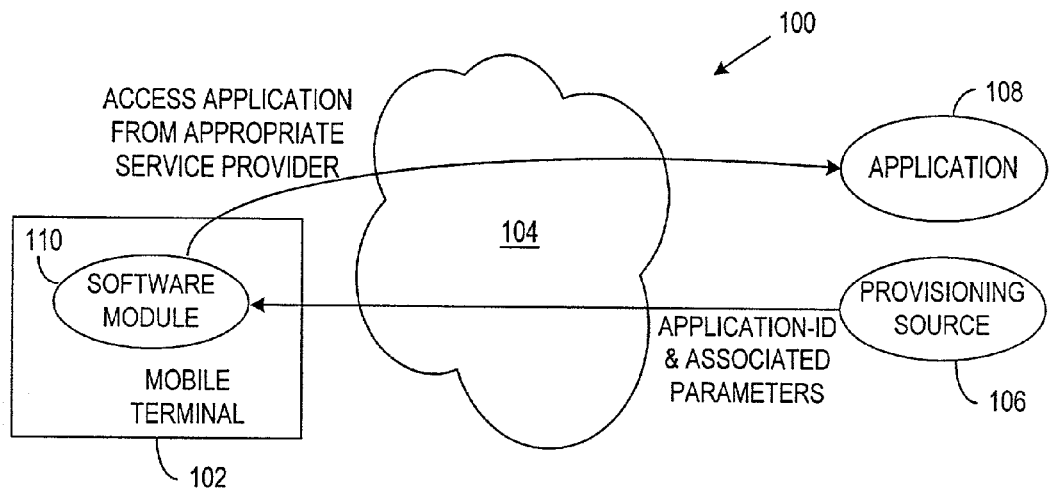
FIG. 1 is an exemplary embodiment of a network system that employs the application identification provisioning and access in accordance with the principles of the present invention.

FIG. 1 is an exemplary embodiment of a network system 100 which employs the application identification provisioning and access in accordance with the principles of the present invention. The invention allows a mobile terminal to access a network application at a specific application server where multiple application servers provide that application. The mobile terminals receive an application identifier (application ID) and associated access parameters during a provisioning process, which allows the mobile terminal to identify the appropriate application server and access characteristics in which to access the application identified by the application ID.

When a mobile user wants to utilize new services available on the network, the terminal must be configured to use those new services. Configuring a terminal to use a service on a network is generally referred to as "provisioning" the terminal. In accordance with one embodiment of the invention, the mobile terminal 102 receives an application ID and associated access parameters over-the-air (OTA) via a network 104 from a provisioning source 106. In another embodiment, the application ID and associated access parameters may be received via direct provisioning means, such as via a smart card, Subscriber Identity Module (SIM), WAP identify module (WIM), or other analogous portable or device-embedded component. The application ID is supplied by the provisioning source 106 to the mobile terminal (s) during mobile terminal provisioning procedures. The provisioning process which supplies the application ID in accordance with the present invention can take place at any time. For example, the provisioning process may occur in connection with providing a new service to a mobile device, or in connection with upgrading services and applications already being used at that mobile terminal. In other examples, the provisioning process may be a bootstrap provisioning process that occurs upon initial setup of the mobile terminal, or a re-provisioning process to update the provisioning information after the initial bootstrap provisioning.

The provisioning source 106 may be any device coupled to the network 104 that can provide such provisioning information, such as a provisioning server. The provisioning source 106 may also be a portable or device-embedded component, such as a SIM, WIM, etc. In the illustrated embodiment, the application ID is provided by the provisioning source 106 over-the-air through implementation of a "push" feature, also known as a "notification" feature or "alert" feature. Such push features are described in greater detail below.

In accordance with one embodiment of the invention, the application ID is embedded within the provisioning information supplied by the provisioning source 106. Therefore, rather than merely being included in a header as a basis for dispatching the message to some other receiving application at the mobile terminal 102, the application ID received by the mobile terminal 102 can in turn be used by the mobile terminal to ultimately access a specific application(s) 108. The application 108 may be made available by, for example, an application server or service available via the network 104.

As is described more fully below, the mobile terminal(s) 102 receive and process an application ID and corresponding access parameters including an identification of one of a plurality of application servers which is to serve the application 108. By recognizing the application ID, the mobile terminal can ascertain the application server that is to serve the application, as well as ascertain other parameters that make access more efficient and/or to allow specific network connectivity settings to be associated with the application 108. One or more software modules or user agents 110 are provided at the mobile terminal 102, where each user agent/software module 110 is originally configured to recognize an application ID and access the appropriate application 108 on the network. Thus, the user agent/software module 110 recognizes the application ID, and uses the application server address information to access the appropriate application server in a manner set forth by the various access parameters.

Figure 2:
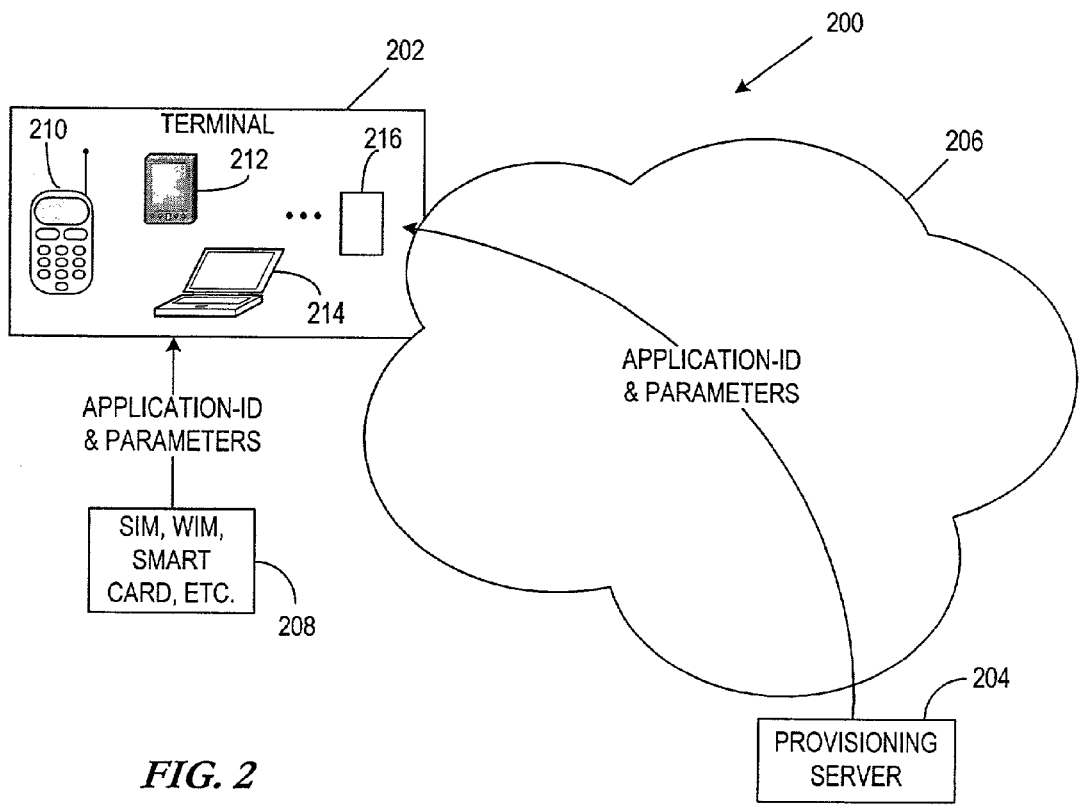
FIG. 2 illustrates another exemplary embodiment of a network system employing the application identification provisioning and access in accordance with the principles of the present invention.

FIG. 2 illustrates another exemplary embodiment of a network system 200 employing the application identification provisioning and access in accordance with the principles of the present invention. The exemplary embodiment of FIG. 2 includes one or more mobile terminals 202 which receives an application ID and associated access parameters from a provisioning source. In one embodiment, the provisioning source providing the application ID and associated parameters is a SIM, WIM, smart card, or other portable or embedded component 208 that can be coupled to the terminal 202. In another embodiment, the application ID and associated parameters are provided to the terminal 202 via a provisioning server 204, where the terminal and provisioning server communicate over any one or more cooperating wireless and landline networks 206.

The mobile terminals 202 may include any type of wireless computing device. For example, the mobile terminal 202 may represent any of a number of wireless communication devices, such as a wireless/cellular telephone 210, a personal digital assistant (PDA) 212, a notebook or laptop computer 214, or any other type of terminal represented by device 216.

An unprovisioned terminal 202 is one that has not undergone a configuration of device/infrastructure connection parameters required to access and use the desired application or service. In a mobile network such as the mobile Internet made possible through technologies such as the Wireless Application Protocol (WAP), proper access to an application may require various types of information. For example, the application may require a specific quality of service (QoS), which can be provided by using network access point information (e.g., GPRS network access point) with specific parameter settings that must be known before the mobile device attempts to contact the application. A network access point definition may include multiple parameters including, for example, dial-up number, line speed, modem initialization string, PPP username and password, used authentication protocol, etc. Further, with the mobile Internet, it is desirable to avoid protocol exchanges so that network delays will not degrade the user experience. As a result, there may be a large number of parameters that need to be provided to the mobile device before it can access and use applications properly.

The provisioning server 204 or other provisioning element provides such provisioning information to the terminal 202 in order to allow the terminal 202 to make the appropriate and most effective connection to the targeted application. In accordance with the invention, this provisioning information includes an application ID serving to notify the mobile terminal 202 of the desired application. The provisioning information includes access parameters associated with that application ID which allow the mobile terminal 202 to be provisioned to access the desired application from a particular one of a plurality of network elements from which the desired application is available. The access parameters also allow the connection to be specifically tailored for the most efficient or otherwise desirable access and use of the application(s).

There are various manners in which the provisioning server 204 may initiate provisioning of the mobile terminal 202. For example, remote servers (not shown) may instigate a communications session with the provisioning server device 204, and provide the provisioning server with provisioning information. As a further example, two existing standards for remote configuration of terminals are the WAP bootstrap provisioning protocol and the Synchronization Markup Language (SyncML) device management protocol. The WAP bootstrap provisioning protocol is an example of a push technology, and SyncML device management is an example of provisioning that may include push technology as well as terminal-initiated provisioning processes. In another embodiment, the provisioning server 204 may instigate the provisioning process and provide the provisioning information and the application ID to the mobile terminal(s) 202 using push technology.

Figure 3:
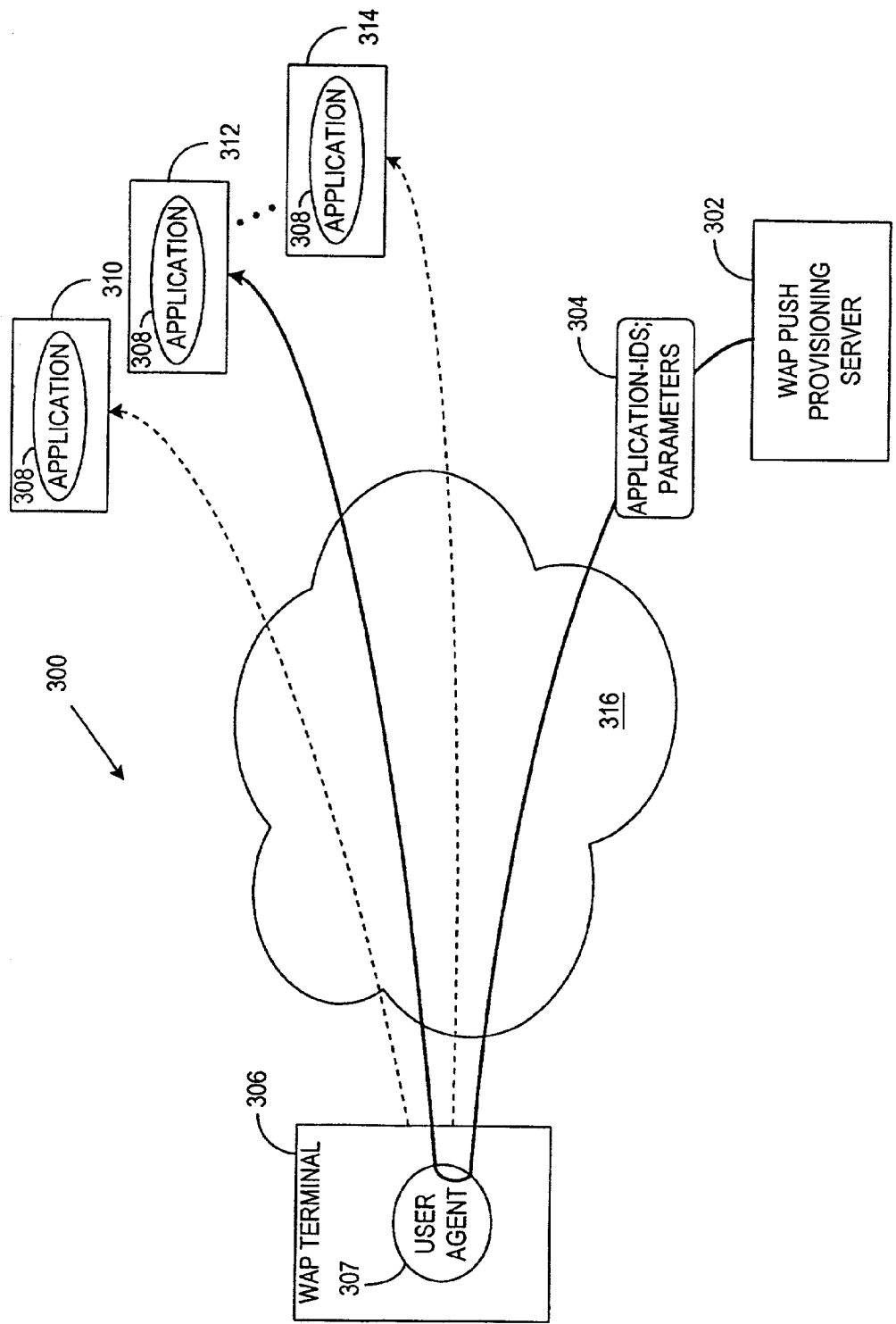
FIG. 3 illustrates a particular embodiment of a network system employing the application ID provisioning and access principles of the present invention in a Wireless Application Protocol (WAP) environment.

FIG. 3 illustrates a particular embodiment of a network system 300 employing the application ID provisioning and access principles of the present invention in a Wireless Application Protocol (WAP) environment. WAP is a technology facilitating the transfer of Internet content to and from wireless devices. WAP integrates the Internet and other networks with wireless network platforms. Generally, WAP is a set of protocols that accounts for characteristics and functionality of both Internet standards and standards for wireless services. It is independent of wireless network standards, and is designed as an open standard. WAP bridges the gap between the wireline Internet paradigm and the wireless domain, to allow wireless device users to enjoy the benefits of the Internet across both platforms.

In the illustrated embodiment of FIG. 3, the mobile terminals employ WAP technology, and the provisioning server is a WAP "push" provisioning server 302. In a typical client/server model, a client requests a service or information from a server, which then responds in transmitting information to the client. This is generally referred to as "pull" technology, where the client pulls the information from the server. For example, entry of a URL at a client device which is then dispatched to the server to retrieve the associated information is a pull transaction. In contrast, "push" technology generally refers to a means to transmit information to one or more devices without a previous user action. Thus, there is no explicit request from the client before the server transmits its information, and therefore push technology essentially includes server-initiated transactions. Push technologies can be used in connection with various protocols and communication technologies. For example, some representative push technologies include WAP Push, Short Message Service (SMS), Multimedia Messaging Service (MMS), Session Initiation Protocol (SIP), as well as others. For purposes of the present example, a WAP environment is assumed.

It should be noted that the illustrated WAP push provisioning server 302 may be used in an embodiment employing WAP bootstrap provisioning protocols. However, WAP provisioning may be extended to other protocols, such as protocols permitting two-way communication of provisioning information. Therefore, while the description provided in connection with FIG. 3 relates to WAP push provisioning, the invention is clearly not limited thereto. Rather, any type of provisioning protocol or technology may be used in accordance with the invention.

With respect to WAP Push technology, WAP specifies a general Protocol (Push Access Protocol) for the communication between a Push service provider and a push gateway of the wireless network. The gateway and the mobile device use a special protocol to communicate, such as Push Over-the-Air Protocol. More particularly, a push operation in WAP occurs when a push initiator (PI) transmits content to a client using either the Push Over-the-Air Protocol or the Push Access Protocol. The PI is on a network, such as the Internet, and the WAP client is in the WAP domain. Often times intermediary management of the communication between the PI and the WAP client is facilitated via a WAP gateway. The PI contacts the gateway from the Internet side, delivering content using Internet protocols. The Internet side gateway access protocol is the Push Access Protocol, which uses extensible Markup Language (XML) messages that may be tunneled through various well-known Internet protocols such as the Hypertext Transfer Protocol (HTTP). The gateway forwards the pushed content to the WAP domain, where the content is transmitted over-the-air (OTA) in the mobile network to the WAP client. The WAP side (OTA) protocol is the Push Over-the-Air Protocol that is based on the Wireless Session Protocol (WSP), which is essentially a binary version of HTTP. There are currently a large number of mobile push and pull technologies, and more such technologies are likely to arise in the future, any of which may be utilized in connection with the present invention.

A standard WAP provisioning server currently includes parameters needed to establish basic network connectivity. This information is implicitly assumed to be applicable to all applications, and there is no means of associating specific parameter settings with a particular application. In accordance with the present invention, the WAP push provisioning server 302 provides an application ID(s) and various access parameters, shown at block 304, to the WAP terminal 306 via the network 316. The application IDs and parameters provided to the mobile terminal 306 solve shortcomings of the prior art where the mobile terminal 306 needs to access one of a plurality of equivalent or standardized applications 308 hosted by different addressable application servers 310, 312, 314 available on the network 316. In particular, an application ID corresponding to the equivalent or standardized applications 308, along with a specific URL/network address and other access parameters 304, are provided to terminal 306. The URL/network address may provide the address of the application server to be accessed by the mobile terminal. In addition, or alternatively, the URL/network address may provide the path, such that the address is also associated with a particular service, such as . . . /companyABC/MMS, where MMS represents a portion of the path to identify the target service. A user agent 307, pre-configured to recognize the application ID, uses the associated access parameters to identify the appropriate application server 310, 312, 314 in which to access the application 308, as well as to associate specific network connectivity settings and access characteristics with the application 308 for that server 310, 312, 314.

For example, the application ID 304 is associated with parameters including the URL or network address of the application server that is to be accessed, such as the application server 312. The parameters associated with the application ID provided to the terminal 306 identify the URL or network address of application server 312 as the particular server to contact in order to use the application 308. In addition, other parameters associated with the application ID may be used to associate specific network connectivity settings with the application 308, and configure other access characteristics required to access, or to facilitate access to, the application 308 at the server 312

WAP push architectures currently implement an application identifier which can be a Uniform Resource Identifier (URI) or an abbreviated registered value. However, the scope of its usage is very limited, as it is defined to be used in the headers of a WAP push message as a basis of dispatching the message to some receiving application within the WAP terminal 306 other than the default application (e.g., browser) when the WAP terminal 306 receives the push message from the network. In accordance with one embodiment of the present invention, an application ID is embedded within documents or records carrying WAP provisioning information, and pushed to the WAP terminal 306. The application ID is then used with its corresponding access parameters for more application-specific connectivity purposes, and to identify the particular application server in which to access the desired application.

In addition to allowing for enhancement or optimization of the connection to a particular application, the present invention thus allows mobile devices to access a particular application provided by multiple network services. For example, where applications and services are standardized, there can be several service providers offering the use of the same application. In this situation, a URL identifying the service provider can not be used to identify the application because it includes the network address of a particular application provider. As a more particular example, the Multimedia Messaging Service (MMS) is a service that is currently a standardized service, but a URL cannot identify the application as well as the service provider because the URL includes the network address of the service provider. Thus, a URL for a standardized MMS application cannot include text referring to Service Provider A if Service Provider B is supplying the application. The present invention solves this problem by provisioning the mobile device with an application ID that can thereafter be used to specify which particular application server among a plurality of application servers is to provide the mobile terminal with access to the standardized application.

It should be noted that the reference to "standardized" applications herein includes, but is not limited to, applications recognized by a standards body. Reference to a standardized application as used herein also includes proprietary "standards" or other arrangements where the user agent in the mobile terminal and the application server agree on the interpretation of a particular application ID.

Figure 4:
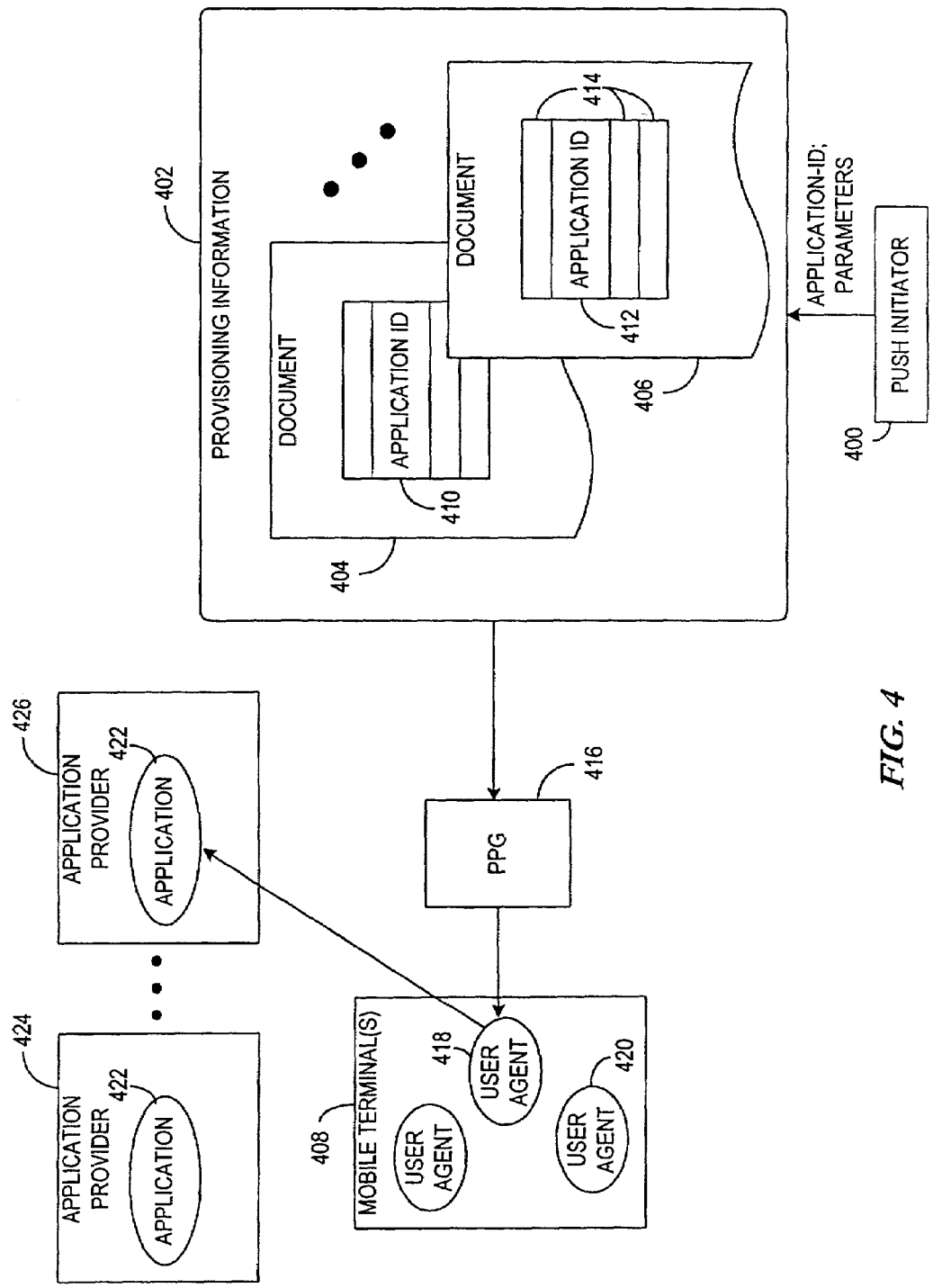
FIG. 4 is an exemplary embodiment illustrating the manner in which an application ID provided via a provisioning process is used to access a particular application in accordance with the invention.

FIG. 4 is an exemplary embodiment illustrating the manner in which an application ID provided via a provisioning process is used to access a particular application in accordance with the invention. In this example, a push initiator provides provisioning information 402. The push initiator 400 may be any server or network element capable of providing provisioning information via push technology, such as a provisioning push server. As previously indicated, other technologies other than push technology may be used to provide the provisioning information 402.

An application ID and one or more other parameters are embedded within one or more provisioning documents 404, 406. In this embodiment, the WAP provisioning information is illustrated in the form of "documents" corresponding to its format as an XML document type. It should be recognized that the terms "document," "file," "record," "block," etc. may be used interchangeably herein to describe any file, record, or structure of the block of information transmitted between the provisioning server and the terminal. Therefore, the use of the term "record," "file," "document," or other terminology is not intended to limit the particular structure or format of the provisioning information provided. These terms are used generically to represent any format or manner of organizing the provisioning information. However, in the illustrated embodiment of FIG. 4 the provisioning documents 404, 406 may be formatted as an XML "document" type, and therefore in this embodiment the provisioning information is referred to as being provided in "documents." It should also be noted that in accordance with the invention, a plurality of application IDs and associated parameters may be embedded within a single provisioning information document, file, record, etc.

The embodiment of FIG. 4 illustrates that multiple application IDs may be provided in one or more documents 404, 406 where the WAP terminal 408 is to be provisioned to access a corresponding number of applications. In the illustrated embodiment, at least two application IDs are supplied to the WAP terminal 408 as part of the provisioning information 402. Application ID 410 is associated with embedded document 404, and application ID 412 is associated with embedded document 406. As previously indicated, additional parameters 414 associated with the provisioning process and that are used to identify the particular application server to be accessed, and potentially other information facilitating access to the application(s), are associated with the embedded documents 404, 406.

The illustrated embodiment assumes a WAP-compliant terminal 408 utilizing WAP protocols in the wireless domain. A push proxy gateway (PPG) 416 or other gateway may be used as an intermediary between the wired and wireless networks. The provisioning information 402, including the application IDs 410, 412 and other parameters 414, are thus pushed to the WAP terminal 408 via the PPG 416. In another embodiment, the push initiator 400 and the required subset of functions of the PPG 416 are integrated into the provisioning server, which communicates directly with the terminals 408 using WAP push and/or other forthcoming extended WAP provisioning protocols.

For a particular application ID, such as application ID 410, the terminal 408 accesses a particular user agent 418 corresponding to the application ID 410. The application ID 410 is originally made known to the mobile terminal 408 as part of the construction of the user agent 418 that is used to access the appropriate application on the network. This allows the mobile terminal 408 to make use of the provisioning information that is labeled using the application ID within the corresponding provisioning document. Other application IDs, such as application ID 412, may be used in connection with another user agent, such as user agent 420. In such a case, the application ID 412 is originally made known to the mobile terminal 408 as part of the construction of the user agent 420 that is used to access a different application on the network. These examples assume user agents in the mobile terminal 408 that were implemented at the mobile terminal 408 prior to the provisioning process. In an alternative embodiment, the user agent(s) may not be present in the terminal 408 when the terminal 408 first receives the provisioning information. In this case, the terminal 408 may use a specialized user agent acting as an application loader. The application loader is able to extract the information from the provisioning document that is needed to download the user agents (e.g., 418, 420) that were previously unknown to the terminal 408. Based on the extracted information, this application loader may also decide to download and update user agents that already exist in the terminal.

The appropriate mobile terminal user agent 418 corresponding to the application ID provisions the terminal 408 for use of the desired application 422 via a particular application provider 426. The particular application provider 426 is identified to the user agent 418 as part of the various access parameters 414 provided in the provisioning information 402. In one embodiment, the particular application provider is identified in the parameters as the application provider URL (embedding the hostname and the application path) or the actual application provider network address for application protocols that do not use URL addressing such as SMTP or IMAP.

In addition to specifying the targeted service provider, the parameters 414 associated with the facilitate access-related connectivity functions as they relate to that identified application. In one embodiment of the invention, the application-ID is used to associate specific network connectivity settings for the corresponding application. Such network connectivity settings may include, for example, parameters associated with network access points such as a GPRS network access point or dial-in access server, proxies required to access the application, and/or quality of service parameters. For example, a particular targeted application may operate sufficiently at a lower quality of service, and the connectivity settings for such an application can be set accordingly. Applications requiring a higher quality of service can similarly be set. This is made possible by providing the application ID to the mobile terminal, which can in turn ascertain particular application attributes in order to determine the appropriate connectivity settings. Regarding network access points, these may include multiple parameters including, for example, dial-up number, line speed, modem initialization string, PPP username and password, used authentication protocol, etc. Regarding proxies, these may also include multiple parameters or settings, such as the actual address, which network access points can be used with the proxy, the services that are provided, etc.

Furthermore, the application ID can be used to identify other parameters 414 that are required or desired to access the application or otherwise make such access more efficient. Such other parameters may include, for example, authentication credentials, content types accepted or preferred by the application server, information required to download the user agent (e.g., application executable, applet, plug-in) that facilitates use of the application, etc.

In one embodiment of the invention, the application IDs, such as application-IDs 410, 412, are the application identifiers defined by current or future WAP Push specifications, or other specifications. For example, in WAP Push specifications, numbers are registered for Push application identifiers. Currently, the number space is divided into three segments. A first segment, represented by numbers 0x0000-0x7FFF, are the "well-known values." For example, 0x04 identifies a Multimedia Messaging Service (MMS) user agent (URN: x-wap-application:mms.ua). Second and third segments are reserved for registration or as experimental values. In one embodiment of the invention, these application identifiers 410, 412 are embedded within documents 404, 406 carrying WAP provisioning information 402 to facilitate access of the desired application 422 at the appropriate application provider 424, 426 by the WAP terminal 408.

In another embodiment, the Internet registered/well-known port numbers could be used as the application ID. In this case, the associated parameters carried by WAP provisioning would relate to the traditional Internet applications, and include, for example, the needed server hostnames, port numbers, mailbox names, etc. For example, in the traditional Internet context, data destined for a particular computer arrives through a connection, but the data may be intended for different applications running on the computer. This is accomplished by identifying ports along with the computer address, and transport layer modules such as TCP and UDP use the port identification to deliver the data to the appropriate application. In accordance with the present invention, the application ID may be provided using these registered port numbers. In this case, the requisite hostnames, port numbers, mailbox names, etc. may also be provided with the provisioning information.

Other existing application identifiers or contrived identifiers may be used as the application ID in accordance with the present invention. Therefore, while the application IDs associated with the WAP Push specifications and the Internet registered port numbers are described above for purposes of illustration, the present invention is not limited thereto. Any current or future application identification scheme may also be employed.

Figure 5:
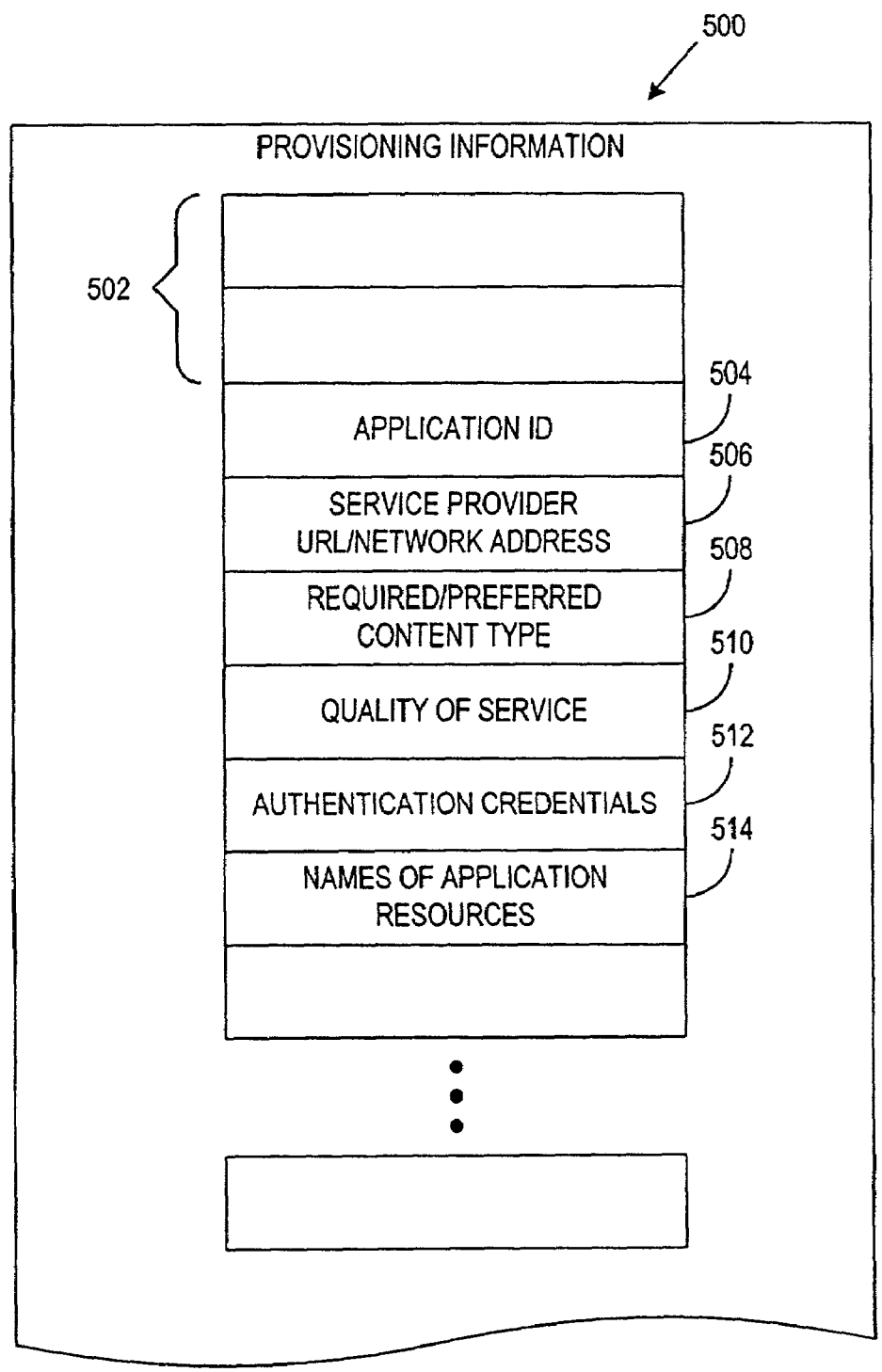
FIG. 5 illustrates an example of a portion of the provisioning content that may be delivered to a mobile terminal in accordance with the present invention.

FIG. 5 illustrates an example of a portion of the provisioning content 500 that may be delivered to a mobile terminal in accordance with the present invention. General provisioning information 502 may be provided, which may include identification of the mobile terminal, such as an IP address, a user name, a Mobile Station ISDN/PSTN Number (MSISDN), or any other identification associated with the terminal. The general provisioning information 502 may also include any other information associated with the particular provisioning process.

In accordance with the invention, the provisioning information 500 includes an application ID 504, as previously discussed. Associated with the application ID 504 are various parameters used to access the application or make access more efficient. For example, the service provider URL or other network address 506 is provided in order to ultimately allow the mobile terminal to identify the particular service provider in which the mobile terminal will access the application. Because the application ID will already be known at the user agent of the mobile terminal, this URL/network address 506 that points to the selected service provider can be associated with the user agent to allow the selected service provider to be accessed. Other representative parameters include the required or preferred content type 508. Examples of such content types include text/vCard, text/x-vCard, text/x-vCalendar, or any other text or multimedia content type. Additional representative parameters include the quality of service 510, authentication credentials 512, and human-readable labels of application resources 514. Other parameters may include specifications of the application resources themselves (e.g., mailboxes, synchronizable databases, etc.) available via the identified application server/service provider. Still other parameters may include the particular access protocol used and/or the version of the protocol. Where Internet registered/well-known port numbers are used as the application IDs in accordance with the invention, the associated parameters carried by WAP provisioning will relate to the traditional Internet applications, and may include hostnames, port numbers, mailbox names, etc. A wide variety of different parameters can be included to facilitate access to the application. The parameters illustrated and/or described in connection with FIG. 5 are provided as exemplary parameters, and the invention is clearly not limited thereto.

Figure 6:
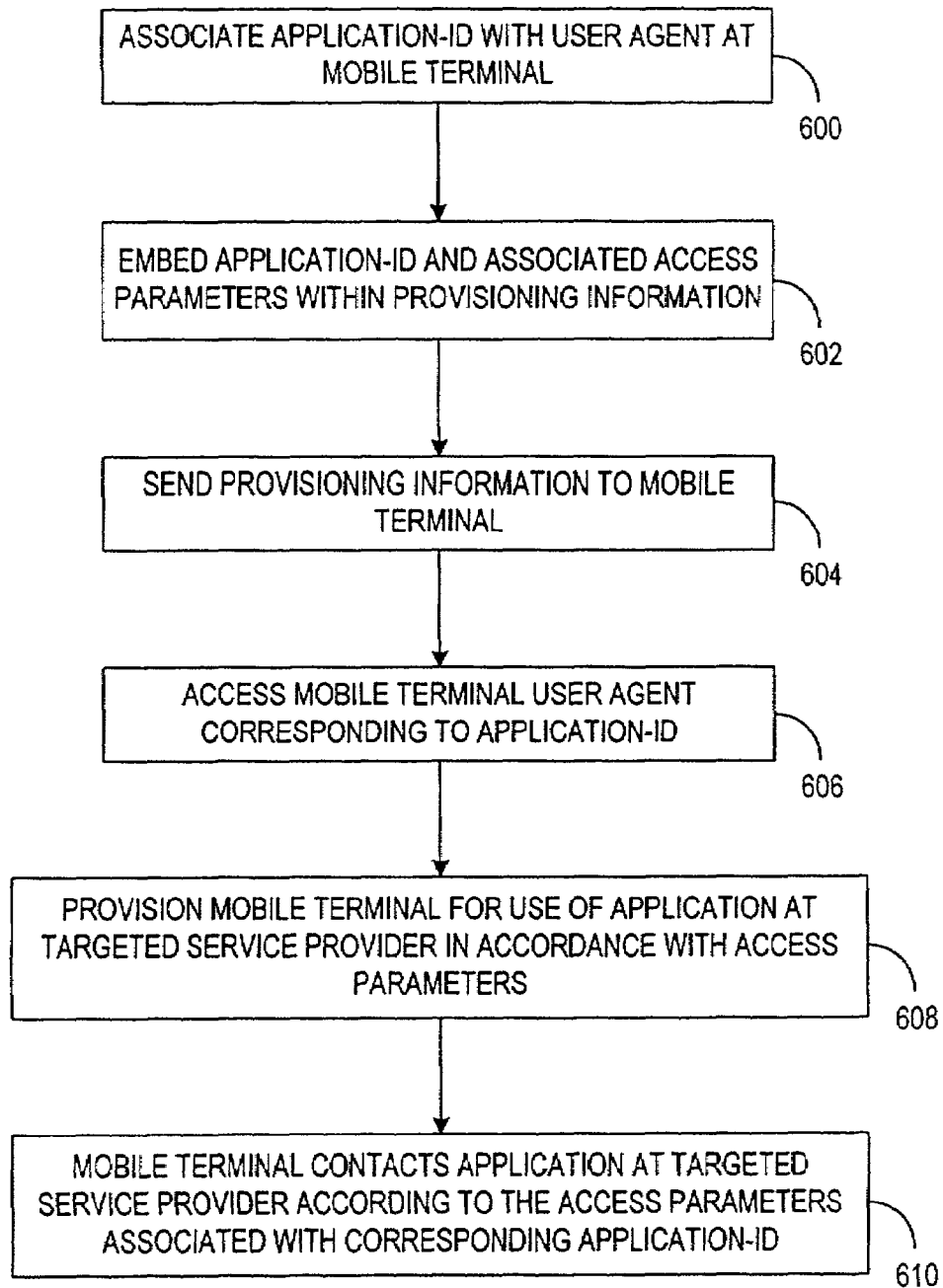
FIG. 6 is a flow diagram illustrating one embodiment of a method for accessing targeted network applications using the application identification provisioning and access principles of the present invention.

FIG. 6 is a flow diagram illustrating one embodiment of a method for accessing targeted network applications using the application identification provisioning and access principles of the present invention. As shown at block 600, the application ID is made known to the mobile terminal as part of the development of the user agent that will be used to access the appropriate application on the network. By associating the application ID with a user agent at the mobile terminal prior to the actual provisioning process, the terminal will be able to make use of the corresponding access parameters labeled with that application ID within the provisioning information.

When a provisioning process is initiated, the application identifier and associated access parameters are embedded 602 within the provisioning information. In one embodiment, where WAP provisioning is implemented, the application ID and parameters are embedded in a provisioning document corresponding to an XML document type or an encoded form thereof such as WAP binary XML (WBXML)-encoded XML. The provisioning information, including the application ID and associated access parameters, are sent 604 to the mobile terminal. The mobile terminal receives the application ID, and accesses 606 the user agent corresponding to that application ID. Using this information, the mobile terminal is provisioned 608 for use of the network application at a targeted service provider identified by the access parameters. When provisioned, the mobile terminal can then contact 610 and use the application at the targeted service provider in accordance with the access parameters associated with the application ID.

Figure 7:
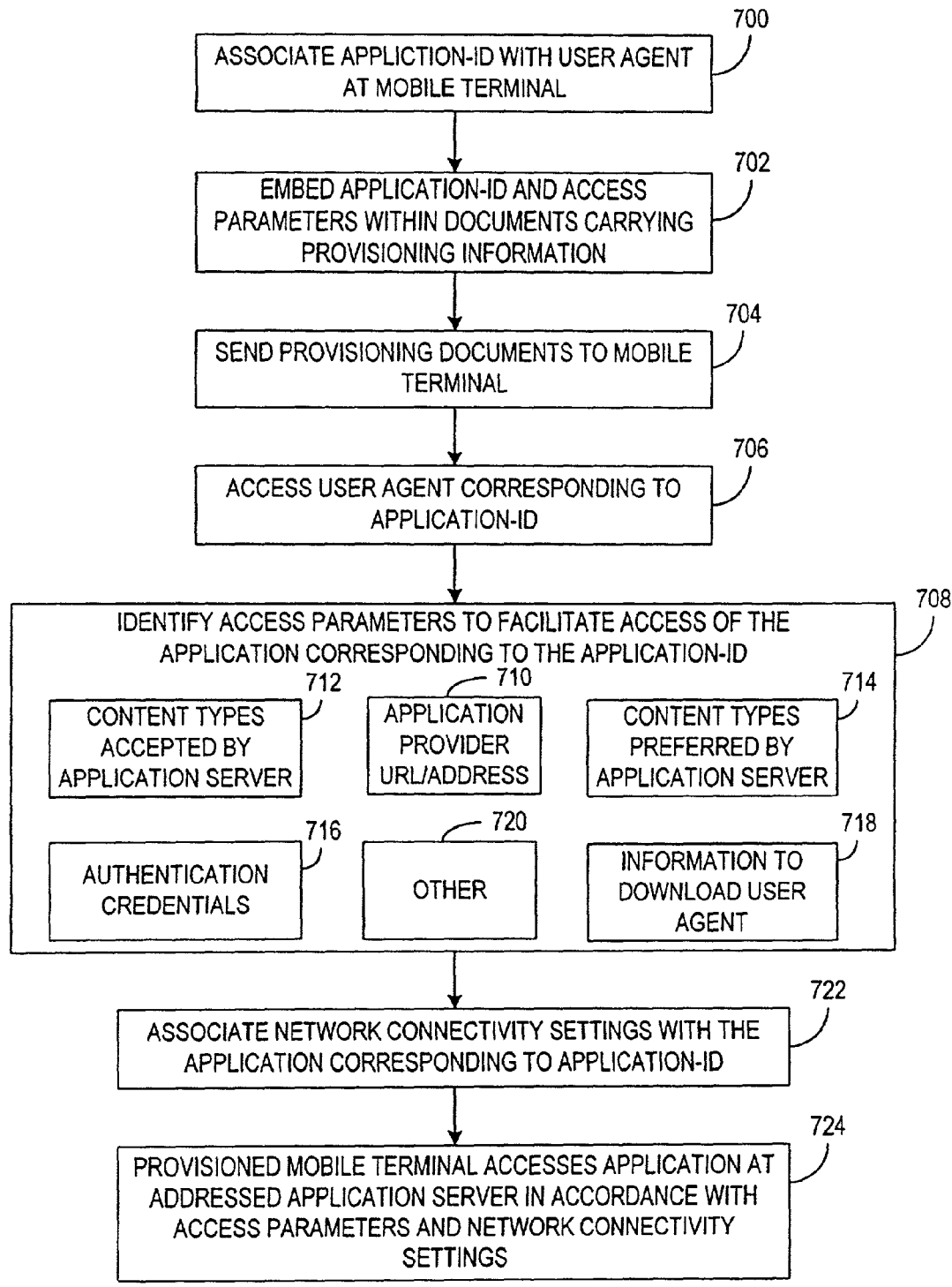
FIG. 7 is a flow diagram illustrating a more particular embodiment of a method for accessing network applications using the application identification provisioning and access principles of the present invention.

FIG. 7 is a flow diagram illustrating a more particular embodiment of a method for accessing network applications using the application identification provisioning and access principles of the present invention. As shown at block 700, the application ID is associated with the user agent at the mobile terminal prior to provisioning time, as was described in connection with FIG. 6. To provision the terminal, the application identifier and associated access parameters are embedded 702 within the provisioning information, which in the illustrated embodiment includes embedding the application ID and parameters into one or more provisioning documents or other provisioning information structure. In one embodiment, the application identifier (and parameters) are embedded into the body or "payload" of the provisioning information rather than into a header of transmitted provisioning information packets. The provisioning information, including the application ID and associated access parameters, is then sent 704 to the mobile terminal. Providing the provisioning information can be accomplished in accordance with any provisioning technology, including pull technology, push technology, some combination of push and pull technology, plugging SIM, WIM or other smart cards into the mobile terminal, etc. The mobile terminal then accesses 706 the user agent corresponding to that application ID.

Using this information, the user agent corresponding to the application ID can identify certain access parameters to facilitate access of the application corresponding to that application ID, as shown at block 708. Among these parameters is a URL or other network address of the application provider, as shown at block 710. For example, a URL can be provided which embeds the hostname, or the actual application server address may be provided for application protocols that do not use URL addressing, such as SMTP, IMAP, etc. In this manner, a particular one of multiple application servers providing the desired application can be targeted as the desired application server.

A variety of other parameters may also be included with the provisioning information to facilitate access to the application at the addressed application provider. These parameters, also discussed in connection with FIG. 5, include the content types accepted 712 or preferred 714 by the application server, authentication credentials 716, and information 718 to download the user agent required to use the application. Many other 720 parameters may also be provided to facilitate access to the application provider in accordance with the present invention. In accordance with one embodiment of the invention, the mobile terminal can also associate 722 network connectivity settings with the application corresponding to the application ID. This may include, for example, network access points such as GPRS network access points, dial-in access server points, proxies needed to access the application, quality of service parameters, etc. Using this information, the properly provisioned mobile terminal can then access 724 the application at the addressed application server in accordance with the access parameters and network connectivity settings.

Using the foregoing specification, the invention may be implemented as a network system, networked apparatus, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, hard disk drives, diskettes, optical disks, magnetic tape, semiconductor memories such as RAM, ROM, PROMS, etc. Transmitting devices include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

It will, of course, be understood that various modifications and additions can be made to the various embodiments discussed hereinabove without departing from the scope or spirit of the present invention. For example, the invention may be used in connection with any type of networking environment, and is not limited to the exemplary WAP network environments described above. From the foregoing description of the illustrated embodiments, those of ordinary skill in the art will readily appreciate the applicability of the invention in any comparable network environment. Accordingly, the scope of the present invention should not be limited by the particular embodiments discussed above, but should be defined only by the claims set forth below and equivalents thereof.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A method for facilitating mobile terminal access to a network application that is hosted by a plurality of application servers on a network, comprising:
   embedding an application identifier corresponding to the network application, and associated application access parameters including an application server address of one of the plurality of applications servers, into provisioning information;
   transferring the provisioning information to at least one mobile terminal in connection with a provisioning procedure associated with establishing basic network connectivity for the at least one mobile terminal; and
   provisioning the mobile terminal to facilitate access to the network application via the application server identified by the application server address provided with the provisioning information.

2. The method as in claim 1, further comprising pre-configuring a software module at the mobile terminal to recognize the application identifier, and accessing the network application via the application server corresponding to the application server address using the software module.

3. The method as in claim 1, further comprising providing one or more user agents at the mobile terminal, and accessing the network application using at least one of the user agents that is pre-configured to recognize the application identifier and to utilize one or more of the associated application access parameters in accessing the network application.

4. The method as in claim 1, further comprising accessing the network application at the addressed application server by the mobile terminal.

5. The method as in claim 1, wherein transferring the provisioning information comprises transmitting the provisioning information from a provisioning source to the mobile terminal via the network.

6. The method as in claim 5, wherein transmitting the provisioning information from a provisioning source comprises transmitting the provisioning information via a push provisioning process over the network.

7. The method as in claim 6, wherein transmitting the provisioning information via a push provisioning process comprises transmitting the provisioning information via a Wireless Application Protocol (WAP) push provisioning procedure.

8. The method as in claim 1, wherein transferring the provisioning information comprises equipping the mobile terminal with a component that stores the provisioning information.

9. The method as in claim 8, wherein equipping the mobile terminal with a component comprises electrically coupling one of a Subscriber Identity Module (SIM), WAP identify module (WIM), and a smart card to the mobile terminal.

10. The method as in claim 1, further comprising associating network connectivity settings with the network application to be accessed via the application server identified by the application server address.

11. The method as in claim 10, wherein associating network connectivity settings with the network application comprises associating with the network application one or more of a quality of service, network access point parameter settings, and proxy parameter settings.

12. The method as in claim 1, wherein provisioning the mobile terminal to facilitate access to the network application further comprises identifying access characteristics of the connection between the mobile terminal and the application server identified by the application server address using one or more of the associated application access parameters.

13. The method as in claim 12, wherein the associated application access parameters comprise one or more of authentication credentials, content types preferred by the application server, and content types required by the application server.

14. The method as in claim 12, wherein the associated application access parameters comprise information used to download at least one application access user agent which enables use of the network application.

15. The method as in claim 14, further comprising invoking a resident user agent within the mobile terminal using the information, wherein the resident user agent effects the download of the application access user agent in response thereto.

16. The method as in claim 14, further comprising:
   downloading the application access user agent to the mobile terminal; and
   accessing the network application via the application server corresponding to the application server address using the application access user agent.

17. The method as in claim 16, further comprising configuring the downloaded application access user agent to recognize the application identifier if the downloaded application access user agent is not pre-configured to recognize the application identifier in order to identify the application server address.

18. The method as in claim 16, wherein the downloaded application access user agent is pre-configured to recognize the application identifier in order to identify the application server address.

19. The method as in claim 12, wherein the associated application access parameters comprise one or more of an identification of an access protocol to communicate with the network application and a version of the access protocol.

20. The method as in claim 12, wherein the associated application access parameters comprise a specification of application resources available on the network application hosted by the application server identified by the application server address.

21. The method as in claim 20, wherein the associated application access parameters further comprise a human-readable label for the application resources available on the network application.

22. The method as in claim 1, wherein embedding the application identifier and associated application access parameters into provisioning information comprises embedding the application identifier and associated application access parameters into one or more of eXtensible Markup Language (XML) provisioning documents and encoded forms of the XML provisioning documents.

23. The method as in claim 1, wherein embedding the application identifier and associated application access parameters into provisioning information comprises embedding the application identifier and associated application access parameters into a provisioning information payload of one or more provisioning information packets.

24. The method as in claim 1, wherein the application identifier comprises an Application Identifier (ID) defined by WAP Push specifications.

25. The method as in claim 1, wherein the application identifier comprises an Internet registered port number.

26. The method as in claim 1, wherein the application identifier comprises a Uniform Resource Identifier (URI) pre-configured at the mobile terminal and the plurality of application servers to identify the network application.

27. The method as in claim 1, wherein the network application comprises a standardized application available on each of the plurality of the application servers.

28. The method as in claim 1, wherein the provisioning procedure comprises a bootstrap provisioning process which provides the application identifier and the associated application access parameters upon initial configuration of the mobile terminal.

29. The method as in claim 1, wherein the provisioning procedure comprises a re-provisioning process which provides the application identifier and the associated application access parameters subsequent to a bootstrap provisioning process.

30. The method as in claim 1, wherein the provisioning procedure is effected in connection with provisioning the mobile terminal for one or more of a new service and an upgraded service.

31. The method as in claim 1, wherein the application server address comprises one of a network address and a hostname of the application server to be accessed by the mobile terminal.

32. The method as in claim 1, wherein the application server address comprises a Uniform Resource Locator (URL) hosted on of the application server to be accessed by the mobile terminal.

33. The method as in claim 32, wherein the URL comprises a path in addition to the application server address.

34. A system for facilitating mobile terminal access to a target application available via a plurality of application servers on a network, comprising:
 a provisioning element to provide one or more provisioning files associated with establishing basic network connectivity, wherein at least one of the provisioning files includes an application identifier corresponding to the target application and application access parameters associated with the application identifier, wherein at least one of the application access parameters comprises an application server address of one of the plurality of application servers; and
 a mobile terminal pre-configured to recognize the embedded application identifier upon receipt of the provisioning files, and to access the target application at the application server address as prescribed by one or more of the application access parameters associated with the application identifier.

35. The system as in claim 34, wherein the provisioning network element comprises a provisioning server coupled to the network and implementing pull technology to transfer the provisioning files to the mobile terminal initiating the transfer via the network.

36. The system as in claim 34, wherein the provisioning network element comprises a provisioning server coupled to the network and implementing push technology to push the provisioning files to the mobile terminal via the network.

37. The system as in claim 36, wherein the mobile terminal comprises a Wireless Application Protocol (WAP)-compliant device.

38. The system as in claim 37, further comprising a push proxy gateway (PPG) coupled between a first network domain in which the provisioning server operates and a WAP network domain in which the WAP-compliant device operates.

39. The system as in claim 37, wherein the application identifier comprises an Application Identifier (ID) defined by WAP Push specifications.

40. The system as in claim 34, wherein the application identifier comprises an Internet registered port number.

41. The system as in claim 34, wherein the application identifier comprises a Uniform Resource Identifier (URI) pre-configured at the mobile terminal and the plurality of application servers to identify the target application.

42. The system as in claim 34, wherein the provisioning network element comprises a component that stores the provisioning files.

43. The system as in claim 42, wherein the component comprises one of a Subscriber Identity Module (SIM), WAP identify module (WIM), and a smart card.

44. The system as in claim 34, wherein the mobile terminal comprises one of a wireless telephone, a personal digital assistant (PDA), and a mobile computer.

45. The system as in claim 34, wherein the mobile terminal comprises at least one user agent pre-configured to recognize the embedded application identifier and to access the target application and to utilize one or more of the application access parameters in accessing the target application.

46. A network element comprising a provisioning server to transmit data readable by a mobile terminal and encoding provisioning information associated with establishing basic network connectivity for the mobile terminal, wherein the provisioning information comprises an application identifier corresponding to a standardized network application hosted by a plurality of application servers, and wherein the provisioning information comprises application access parameters associated with the application identifier wherein at least one of the application access parameters is an application server address of one of the plurality of application servers in which a mobile terminal recipient of the data signal can access the standardized network application.

47. A computer-readable medium having computer-executable instructions for facilitating mobile terminal access to a network application that is hosted by a plurality of application servers on a network, the computer-executable instructions performing steps comprising:
 embedding an application identifier corresponding to the network application, and associated application access parameters including an application server address of one of the plurality of applications servers, into provisioning information;
 transferring the provisioning information to at least one mobile terminal in connection with a provisioning procedure associated with establishing basic network connectivity for the at least one mobile terminal; and provisioning the mobile terminal to facilitate access to the network application via the application server identified by the application server address provided with the provisioning information.

48. A mobile terminal capable of accessing a target application available via a plurality of applications servers coupled to a network, comprising:
- a module capable of accessing a provisioning network element via the network to receive at least one provisioning file associated with establishing basic network connectivity, the provisioning file including at least an application identifier corresponding to the target application and an associated application server address of one of the plurality of application servers; and
- a user agent configured to recognize the application identifier upon receipt of the provisioning file, and configured to access the target application at the application server corresponding to the application server address.

49. An apparatus capable of being electrically coupled to a mobile terminal that is capable of accessing a target application available via a plurality of applications servers coupled to a network, comprising:
- a memory capable of storing at least one provisioning file that includes at least an application identifier corresponding to the target application and an associated application server address of one of the plurality of application servers; and
- a data interface capable of transferring the provisioning file, in a transfer associated with establishing basic network connectivity for the mobile terminal, to the mobile terminal for purposes of provisioning the mobile terminal to facilitate access to the network application via the application server identified by the application server address.

50. The apparatus of claim 49, wherein the apparatus comprises at least one of a Subscriber Identity Module (SIM), WAP identify module (WIM), and a smart card.

* * * * *

UNITED STATES PATENT AND TRADEMARK OFFICE
CERTIFICATE OF CORRECTION

PATENT NO.        : 7,363,354 B2                                         Page 1 of 1
APPLICATION NO.   : 09/998367
DATED             : April 22, 2008
INVENTOR(S)       : Jerry Lahti It is certified that error appears in the above-identified patent and that said Letters Patent is hereby corrected as shown below:

In the Specification:

Col. 8, line 16: "uses extensible Markup" should read --uses eXtensible Markup--.

In the Claims:

Col. 18, line 53

Claim 46, "signal can access" should read --can access--.

Signed and Sealed this

Second Day of September, 2008

JON W. DUDAS
*Director of the United States Patent and Trademark Office*